Patented Nov. 2, 1926.

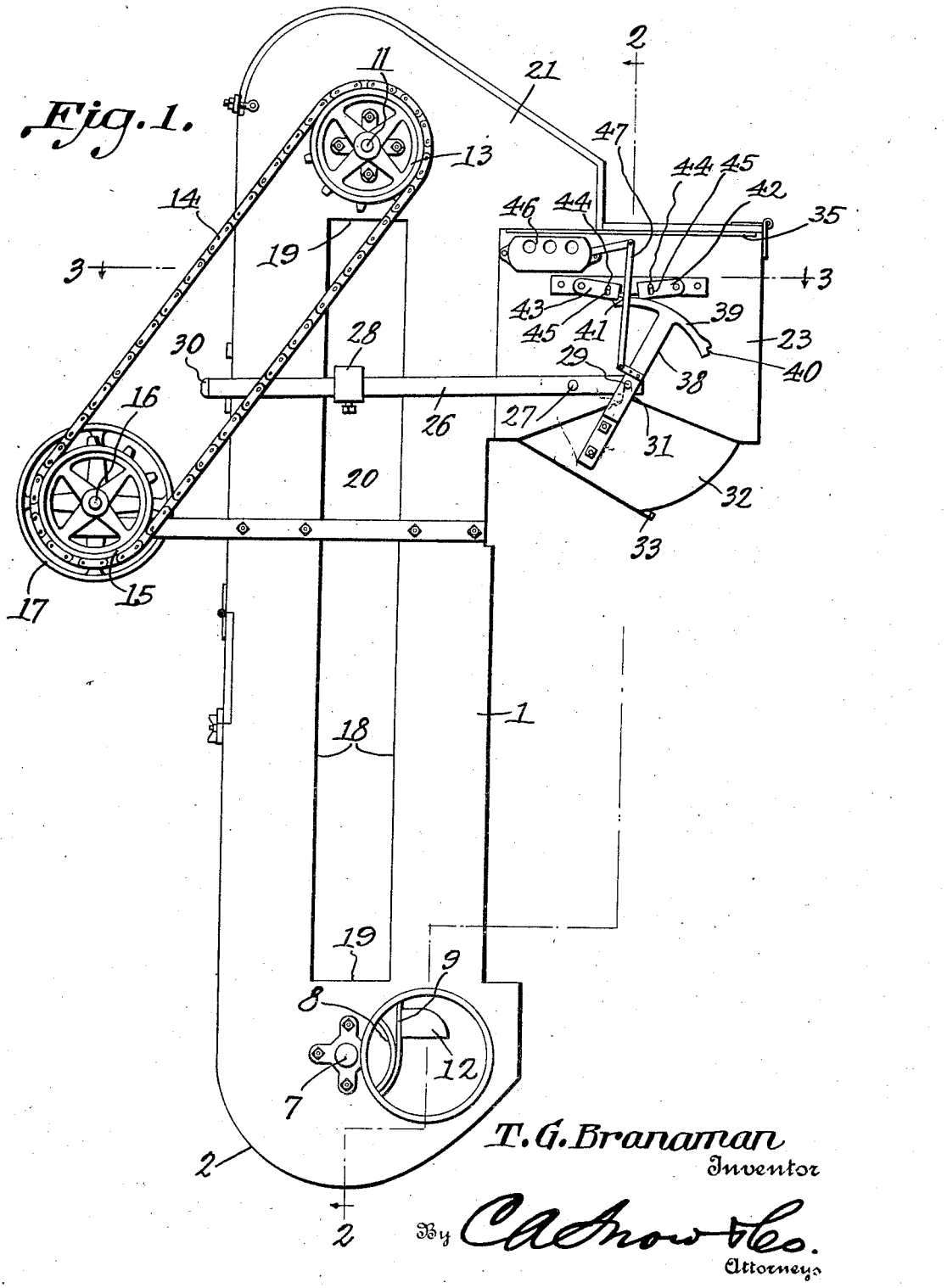

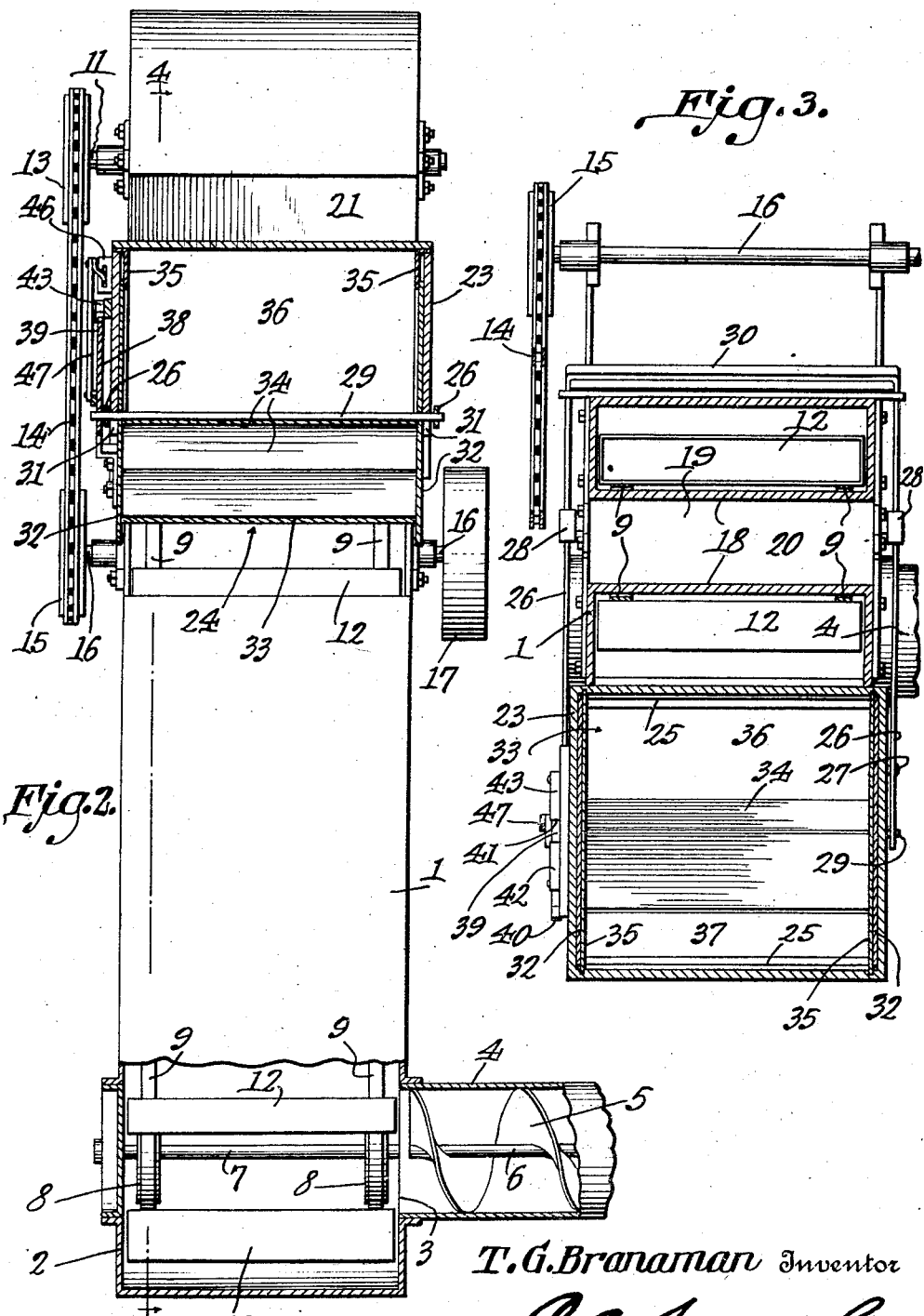

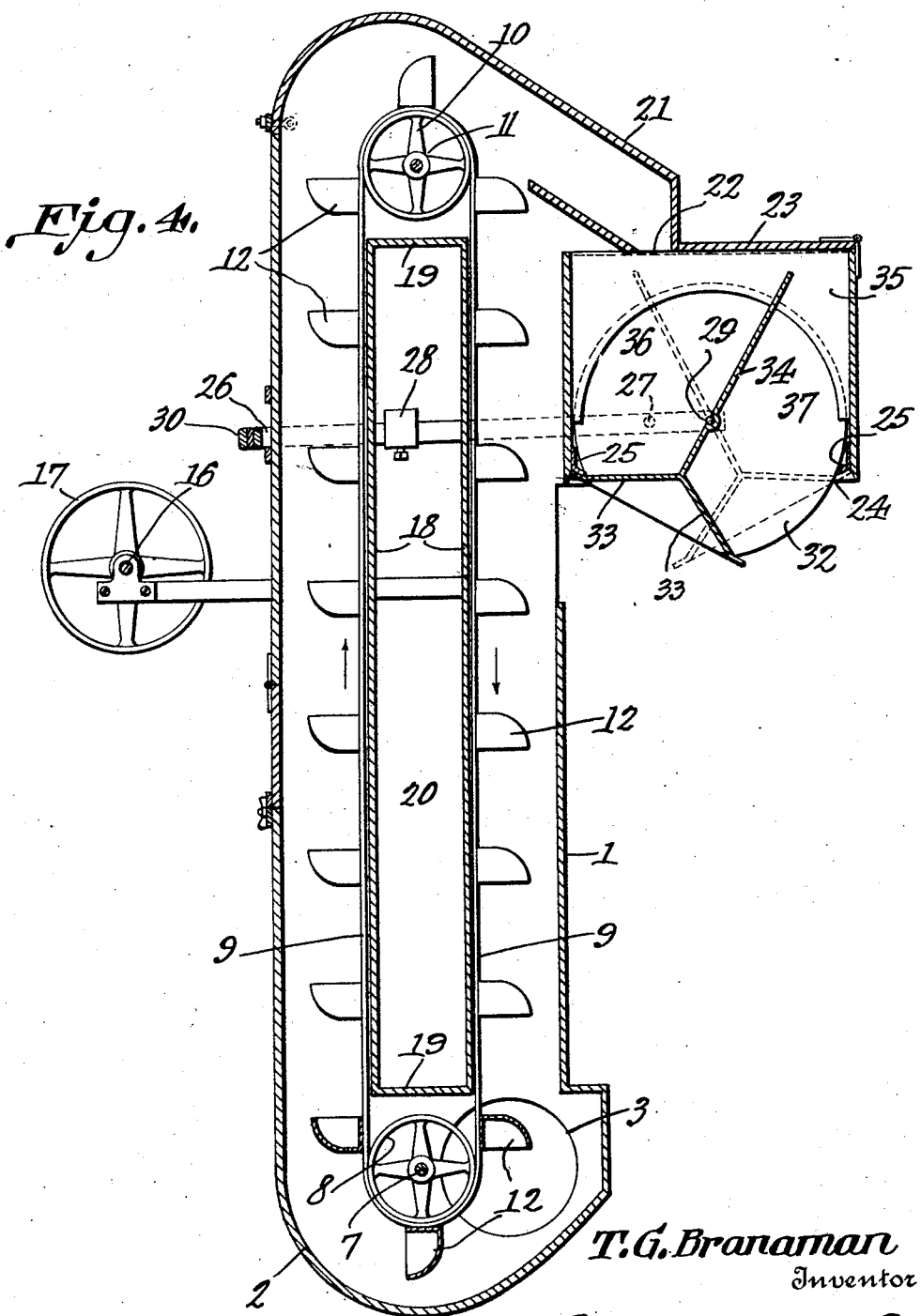

1,605,700

UNITED STATES PATENT OFFICE.

THOMAS G. BRANAMAN, OF HUTCHINSON, KANSAS.

APPARATUS FOR ELEVATING AND WEIGHING GRAIN AND THE LIKE.

Application filed March 2, 1926. Serial No. 91,777.

This invention relates to apparatus for elevating and weighing grain and the like, one of the objects of the invention being to provide a simple and compact structure by means of which small grain such as wheat, rye, barley, oats, etc. can be quickly elevated and thereafter weighed, the material as it is weighed being delivered into a wagon or other structure.

A further object is to provide weighing and delivering mechanism which will operate automatically and intermittently so that no attention is required during the weighing and delivering operation.

A further object is to provide a structure which will not clog, and which will handle the material without waste.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the apparatus.

Figure 2 is a section on line 2—2 Figure 1, a portion of the feed worm being shown, the lower portion of the casing of the feed worm and of the elevator being in section.

Figure 3 is a section on line 3—3 Figure 1.

Figure 4 is a section on line 4—4 Figure 2, a portion of the elevator being shown in elevation.

Referring to the figures by characters of reference 1 designates the casing of an elevator provided, at its lower end, with a boot 2 in one side of which is formed an inlet opening 3. A feed pipe or casing 4 opens into this inlet 3 and has a feed worm 5 mounted for rotation therein with a shaft 6 which terminates at the opening 3 and is adapted to be rotated by any suitable mechanism not shown. Extending transversely of the boot 2 back from the opening 3 is a shaft 7 carrying sprockets 8 or the like on which are mounted endless belts 9 extending upwardly within casing 1 and over sprockets 10 or the like secured to a transverse shaft 11 within the upper portion of the casing. The belt 9 which can be in the form of chains or other suitable flexible structures, are connected by buckets 12 and these buckets are designed to travel in the direction indicated by the arrows in Figure 4. In other words the downwardly moving buckets are inverted with their open faces lowermost while the upwardly moving buckets have their open faces uppermost. These buckets are designed to travel downwardly past the opening 3 so as to move downwardly through the grain as it is delivered into the boot through the opening after which the buckets scrape the grain rearwardly and thence carry it upwardly to the uppermost portion of the casing 1. Any desired means may be employed for driving the elevator. For example, and as shown in Figures 1, 2 and 3 the shaft 11 may be provided with a sprocket 13 receiving motion through chain 14 from a sprocket 15 secured to a drive shaft 16, there being a pulley 17 or the like on this shaft for receiving motion from a belt or the like, not shown.

As shown in Figures 1, 3 and 4 the downwardly and upwardly moving flights of the elevator can be supported close to inner transverse walls 18 connected at their ends by upper and lower transverse walls 19. Thus a space 20 is provided along the center of the casing, this space being open through the sides of the casing and the walls thereof serving as guides for the elevator.

An outlet spout 21 is inclined downwardly from the upper portion of the casing 1 and is so located that as the buckets 12 are successively inverted, the contents thereof will be directed into the spout and gravitate therealong to its outlet 22. This outlet opens into the top of the casing 23 of the weighing and delivering mechanism. The bottom of the casing is open as shown at 24 and has inwardly extending flanges 25 upon the front and back walls thereof constituting stops as hereinafter explained.

Straddling the casing 1 and the casing 23 is a yoke 26 fulcrumed upon laterally extending studs 27 projecting from the sides of the casing 23 and disposed in alinement. This yoke constitutes a scales beam and may be provided with one or more weights 28 adjustably mounted on the respective sides of the yoke. The free ends of the yoke are connected by a rod 29 and the opposite end portion of the yoke is preferably weighted as shown at 30 so as to hold this rod normally pressed upwardly into recesses 31 formed in the sides of the casing 23 at the center of the lower edges thereof.

Mounted to rotate on the rod 29 are side plates 32 connected by downwardly diverging bottom plates 33. A deflecting plate 34 is extended from the line of juncture of the two plates 33 and also serves to connect the side plates 32, this deflecting plate and the respective plates 33 forming equal obtuse angles. Guard plates 35 are fitted within the upper portions of the casing 23 at the sides thereof and lap the upper marginal portions of the side plates 32 so as to prevent bulk material from entering between the sides of casing 23 and the side plates 32. The deflecting plate 34 is so located that, when tilted in one direction it will cause one of the bottom plates 33 to come against one of the stop flanges 25, as shown in Figure 4, thus leaving a bulk compartment 36 in communication with the outlet 22. When the plate 34 is tilted to its other extreme position, however, as indicated by broken lines in Figure 4, the other bottom plates 33 will come against the front flange 25 and the plate 34 will be located so as to establish communication between the outlet 22 and the other bulk compartment 37.

Connected to one of the side plates 32 so as to swing therewith is an arm 38 located outside of the casing 23 and provided, at its free end, with an arcuate head 39 having notches 40 and 41 in opposite end portions. Oppositely disposed dogs 42 and 43 are pivotally mounted on one side of the casing 23 and are limited in their downward and upward movement by lugs or pins 44 extending through slots 45 in the dogs. These dogs are so located that when the deflecting plate 34 is swung to one extreme position as shown by full lines in Figure 4, the dog 43 will drop into the notch 41 and thus hold the parts against movement. When the deflecting plate 34 is swung to its other extreme position, however, as indicated by broken lines in Figure 4, the dog 42 will drop into the notch 40.

A counter of any suitable construction and which has been indicated generally at 46, can be used in connection with the weighing apparatus, this counter being connected by link and lever mechanism 47 to the arm 38 so that the number of oscillations of the weighing element can be totaled.

In using the apparatus the elevator is set in motion and the worm 5 is actuated so as to direct the grain into the boot 2. The buckets of the elevator will successively plow through and elevate portions of the grain and the contents of the buckets will be successively delivered into the spout 21 and thence into the casing 23. If the parts of the weighing mechanism are positioned as shown by full lines in Figure 4 the bulk material will be directed into the compartments 36. This material will be retained in said compartments until a predetermined weight of material is accumulated. At that time the weights 28 will be overbalanced and the yokes 26 will be shifted so that rod 29 will move downwardly within the recesses 31. This movement will be sufficient to withdraw the notch 41 from the dog 43. Consequently the weight of the material on the bottom plate 33 thereunder will be sufficient to cause the released structure to swing upon the rod 29 so that the material will be delivered from the compartment 36. At the same time the plate 34 will swing to its other extreme position, indicated by broken lines in Figure 4, the bottom of the bulk compartment 37 will be closed and the dog 42 will drop into the notch 40. Thus the parts will be reset and the bulk compartment 37 will begin to fill, plate 34 serving to direct the material from the outlet 22 into said compartment. When the proper weight of material is accumulated within the compartment 37, the yoke 26 will again be tilted whereupon the operation already described will be repeated and the parts again reset. Each operation of the weighing mechanism will be counted at 46.

It will be noted that the construction of the apparatus is such that the same will not become clogged. The material is fed transversely into the bottom 5 and the buckets 12 will plow through it. The sprockets 8 are back from the opening 3 where they will not materially interfere with the flow of the grain into the boot. The weighing mechanism cannot become clogged and by providing the stop flanges 25, the bulk compartments are tightly sealed at the bottom so that there will be no waste of material at these points. Any material not delivered into the spout 21 will fall downwardly within the casing 1 and be again picked up by the buckets.

What is claimed is:

1. In apparatus of the class described a casing, a tiltable structure therein including a deflecting plate and downwardly diverging bottom plates, said casing being open at the bottom and having a feed opening at the top, said tiltable structure cooperating with the casing to provide separate bulk compartments and being tiltable to either of two extreme positions to place the respective compartments in communication with the feed opening and to close the bottom plate of said compartment against the casing to limit the tilting movement of the tiltable structure, the bottom plate of the other compartment being in open position, weighing means yieldingly supporting the tiltable structure, a member movable with the tiltable structure, and separate holding means for engagement with said member to hold the tiltable structure against return movement from either of two extreme positions, said structure being movable downwardly under the weight of a load within the closed compartment for releasing said member from its holding means, the said tiltable structure, when released, being movable from one extreme position to the other extreme position, thereby to deliver the contents of the loaded compartment and to place the other compartment in communication with the feed opening.

2. The combination with an endless elevator including buckets movable downwardly in inverted positions and upwardly in bulk retaining positions, and means for directing bulk material laterally into the paths of the descending inverted buckets, of a casing having a feed opening in communication with the upper portion of the elevator, said casing being open at the bottom, a structure tiltably mounted within the casing and including a deflecting plate and downwardly diverging bottom plates, said structure cooperating with the casing to provide separate bulk receiving compartments, the said structure when in one extreme position constituting means for directing material from the feed opening into one of the bulk compartments and closing the bottom of said compartment, the other bulk compartment being open at the bottom, a member movable with the tiltable structure, separate means for engaging said member to hold the tiltable structure in either of two extreme positions, and yielding means for supporting said structure, said means being yieldable under the weight of a load within the closed bulk compartment for releasing the structure from its holding means, the structure when released being tiltable from one extreme position to the other extreme position, thereby to release the contents of the filled compartment and position the other compartment to receive material from the feed opening.

In testimony that I claim the foregoing as my own, I have hereto affixed my signature.

THOMAS G. BRANAMAN.